Patented Dec. 1, 1953

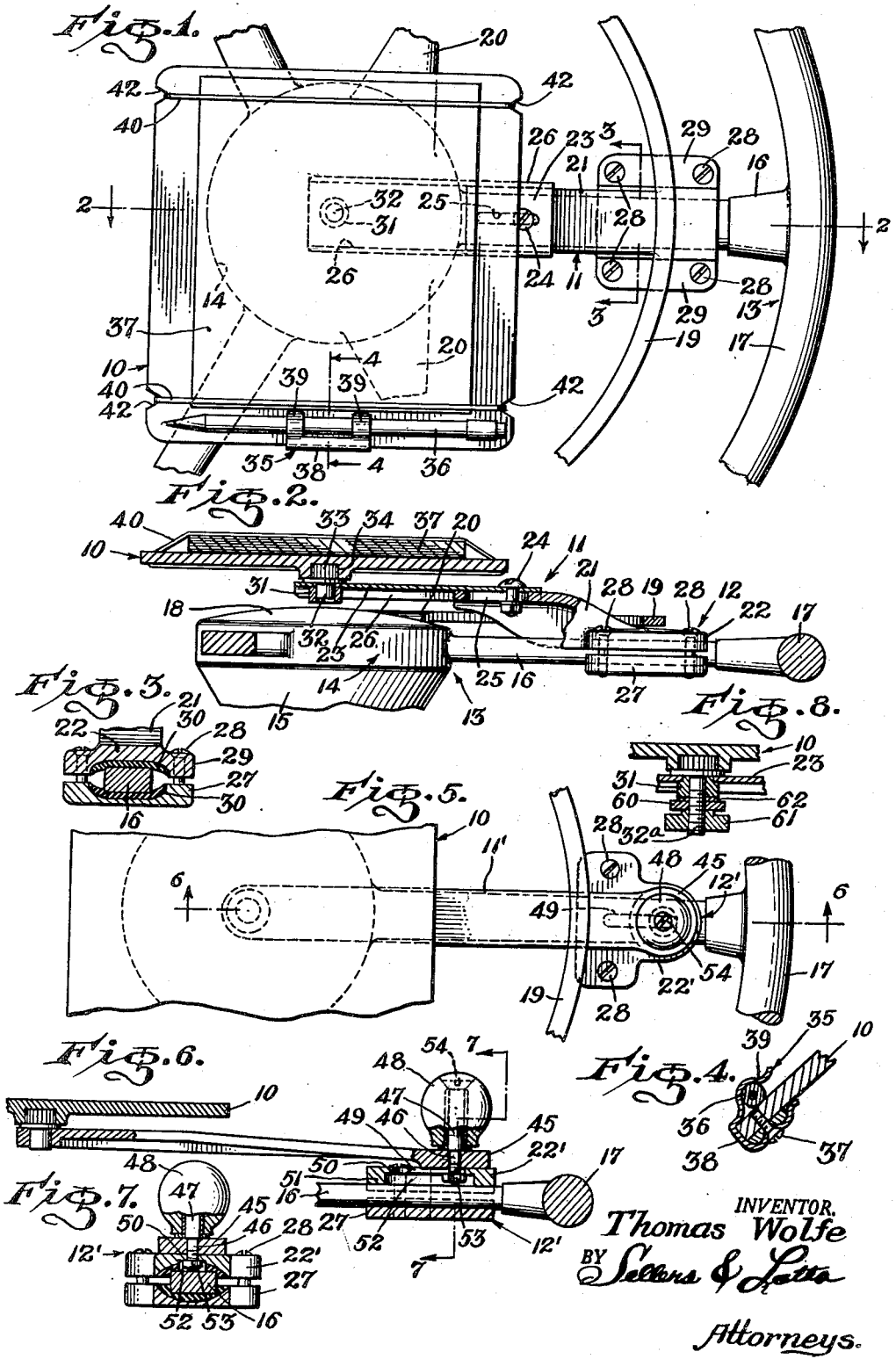

2,661,222

UNITED STATES PATENT OFFICE 2,661,222

STEERING WHEEL MOUNTED HOLDER

Thomas Wolfe, Pasadena, Calif.

Application July 18, 1951, Serial No. 237,455

7 Claims. (Cl. 281—1)

This invention relates to a holder, to be mounted upon the steering wheel of an automotive vehicle, for supporting a memorandum pad, order pad, map, or the like, directly in front of the driver of the vehicle and providing a support enabling the driver to write upon the pad while driving the vehicle.

The invention is useful to persons who may have occasion to record notes of conferences, make records of sales, etc., while travelling between various points being covered in an occupation which calls for a considerable amount of travelling. The primary object of the invention is to provide such a holder which, without interfering with the efficient and safe operation of the steering wheel, will enable a driver, while driving with one hand, to have immediately in front of him a pad upon which he may make records or notes. The invention further provides a holder upon which such a pad may be constantly supported in a position which is properly oriented with reference to his line of vision, and with reference to his writing hand.

A specific object of the invention is to provide such a holder adapted to be supported by the steering wheel and yet to always maintain a fixed position, unaffected by rotation of the steering wheel.

A further object is to provide such a holder having means for detachably connecting the same to a conventional steering wheel without presenting an obstruction either to the rim of the wheel or to the conventional horn operating ring.

Another object is to provide a holder which in addition to the features referred to above is of relatively simple and inexpensive and yet sturdy and durable construction.

Other objects will become apparent in the ensuing specifications and appended drawings in which:

Fig. 1 is a plan view of a portion of a steering wheel, with the pad holder of my invention attached thereto;

Fig. 2 is a transverse sectional view thereof taken on the line 2—2 of Fig. 1;

Fig. 3 is a detail sectional view taken on the line 3—3 of Fig. 1;

Fig. 4 is a detail sectional view taken on the line 4—4 of Fig. 1;

Fig. 5 is a plan view of a portion of a modified form of the invention;

Fig. 6 is a transverse sectional view of the arrangement shown in Fig. 5, taken on the line 6—6 of Fig. 5;

Fig. 7 is a detail sectional view taken on the line 7—7 of Fig. 5; and

Fig. 8 is a fractional sectional view of a further modification of the invention.

Referring now to the drawings in detail, I have shown in Figs. 1–4 as an example of one form in which the invention may be embodied, a memo pad holder comprising, in general, a pad supporting easel 10; an arm 11 supporting the easel 10; and a clamp 12 for attaching the same to a steering wheel 13. The steering wheel shown is one of conventional construction, including a hub portion 14, rotatably mounted on the upper end of a steering post 15, spokes 16 extending radially from hub 14, and a rim 17 secured to the outer ends of spokes 16. A conventional horn button 18 is tiltably mounted above hub 14 in coaxial relation thereto, and constitutes the hub portion of a horn operating ring 19 which is connected thereto by radial spokes 20.

The arm 11, in this form of the invention, comprises two sections, namely a bracket section 21, the outer end of which is integrally formed with the upper jaw 22 of the clamp 12; and an extension arm 23 which is connected to bracket 21 for longitudinally extending and retracting movements, in order to adjust the easel 10 to a selected position (e. g. centered over the axis of steering wheel 13). Such adjustment may be required in view of differences in diameter of steering wheels in differing makes of automobiles, and differences in diameter of the horn ring 19 thereof. These differences may require adjustment of the clamp 12 to positions of varying radial distance from the center of the steering wheel and such adjustments are compensated for by adjustments of the overall length of supporting arm 11, in order to locate the easel 10 in the desired position. As shown, the extensible connection between bracket 21 and extension arm 23 comprises a bolt 24 extending through a hole in extension arm 23 and through an elongated slot 25, disposed in the longitudinal medial plane of bracket 21. Extension arm 23 is of channel section, having side flanges 26 which snugly embrace the sides of bracket 21, so as to maintain a secure, fixed alignment of extension arm 25 with bracket 21. By tightening bolt 24, the position of extension arm 23 may likewise be fixed.

Clamp 12 comprises the jaw 22, integral with bracket 21, and a lower jaw 27 connected to jaw 22 by a series of clamp screws 28, rotatably extended through ears 29 extending laterally from the respective sides of jaw 22, and threaded into jaw 27, which has a marginal contour corresponding in dimension and shape to that of ears 29. Jaws 22 and 27, in cross section (Fig. 3) are in the form of shallow channels, with recesses facing each other and lined with pads 30 which frictionally grip the steering wheel spokes 16 without marring the finish thereof. The channel shaped depressions are aligned and symmetrical with the longitudinal medial plane of bracket 21, whereby extension arm 23 is disposed in the common plane of arm 16 and the steering wheel axis.

The invention is characterized by the provision of a freely rotating connection between easel 10 and the inner end of extension arm 23. Any suitable known bearing means for providing a freely rotatable connection, may be employed. The particular bearing shown herein comprises a lubricant saturated bushing 31 fixed in the web of extension arm 23 at the inner end thereof, and a trunnion 32 having a narrowed or roughened head 33 molded into a boss 34 in the under side of easel 10, with trunnion 32 freely rotating in bushing 31. The rotatable connection 31, 32, is located nearer the top than the bottom of easel 10, as shown in Fig. 1. The lower end of the easel is weighted by the excess of weight of the lower portion of the easel over that of the upper portion thereof, above pivot 31, 32, and the corresponding unequally divided portions of a memo pad 37, supported upon the easel. It may be further weighted by a pencil clip 35, secured thereto, and by a pencil 36 carried in the clip.

The pencil clip 35, of suitable spring sheet metal or resilient sheet plastic, may, as shown in Fig. 4, be of U-clip shape with an underarm 36 secured to easel 10 by a screw 37, a web portion 38 extending around the lower edge of easel 10, and a pair of spaced arched resilient fingers 39, beneath which the pencil may be slipped by sliding it downwardly over the surface of the lower end of pad 37 (or by pushing it in endwise point first) the fingers 39 yieldingly grasping and holding the pencil.

Pad 37 is held to easel 10 by rubber bands 40 stretched around the upper and lower ends of easel 10 and retained in notches 42 in the side margins of the easel.

It will now be apparent that the invention provides for supporting the easel 10 in a position which may be adjusted so as to be substantially centered over the steering wheel, the vertical axis of the easel being accurately centered on the steering wheel axis; and will have a pendant action maintaining the vertical axis of the easel at all times in a vertical plane, while the steering wheel is rotated beneath it. The excess weight in the lower portion of the easel provides this pendant action (freely hanging, gravity stabilized positioning).

In the modified form of the invention shown in Fig. 5, instead of the two part supporting arm 11 of the previously described form of the invention, I provide an integral arm 11' having at its outer end a disc shaped pad 45 the under surface of which is flat and is frictionally engaged against the flat upper surface of an upper jaw member 22' of clamp 12'. A threaded stud 46, which may be an integral, downward extension of a post 47 on which a knob 48 is rotatably mounted, extends downwardly through the center of pad 45 and through an elongated slot 49 in a thin upper web portion 50 of jaw 22'. Web 50 provides a flange extending inwardly from a peripheral, thickened rim portion 51 of jaw 22', defining a recess 52 in which is received a nut 53 which is threaded onto stud 46. The lower jaw 27 is secured to upper jaw 22' by screws 28, as in the other form of the invention.

Post 47 has at its upper end a screw head 54, provided with a conventional screw driver slot whereby the post 47 may be rotated so as to tighten or loosen the clamping engagement of pad 45 against jaw member 22'.

It will be understood that the axis of pivot 31, 32 is non-vertical. It may, as indicated in the drawing, be substantially parallel to or aligned with that of the steering column of the vehicle (in which case it will be inclined upwardly and rearwardly at an angle in the neighborhood of 45° or less, to the horizontal) or it may be tilted downwardly somewhat below the angle of inclination of the steering column. In any event, however, the lower end of the easel will be supported in a position clearing the horn button.

As a further modification of either of the structures described above, the invention contemplates an arrangement, such as that shown in Fig. 8, in which the trunnion 32a constitutes a bolt having a threaded end on which a nut 60 and locknut 61 are adapted to provide for controlled frictional engagement (e. g. through a washer 62) of the lower end of bearing 31, whereby the bearing may be adjusted from a free, anti-friction bearing to one providing sufficient frictional resistance to rotation of the easel 10 relative the steering wheel, so that it will remain in any fixed position of adjustment relative to the steering wheel, yet may be readily shifted manually. For example, by resting the forearm or hand against the easel, its position may be maintained fixed relative to the hand that is writing thereon, while the steering wheel is shifted by the other hand.

I claim:
1. In a holder of the class described, for the steering wheel of an automotive vehicle: supporting means attachable to said steering wheel and having a portion arranged to extend over the center of the steering wheel when the supporting means is attached to the steering wheel; and an easel pivotally attached in substantially vertical alignment with the center of the steering wheel to said portion on a single non-vertical axis that is fixed with reference to said supporting means, said easel having a portion below said axis of greater weight than its portion above said axis, whereby said easel will be gravity actuated to remain in an upright, non rotating position irrespective of rotation of the steering wheel.

2. In a holder of the class described, for the steering wheel of an automotive vehicle: supporting means attachable to said steering wheel with a portion thereof extending over the center of the steering wheel; a pad supporting easel; and an anti-friction bearing constituting a connection between said portion of the supporting means and said easel on a single non-vertical axis that is fixed with reference to said supporting means and substantially vertically aligned with the axis of the steering wheel whereby the easel is supported for freely pendant positioning in a plane that is fixed with reference to the steering wheel, and in a relatively fixed position with reference to the vehicle without being affected by rotation of said steering wheel.

3. In a holder of the class described, for the steering wheel of an automotive vehicle: supporting means attachable to said steering wheel with a portion thereof extending over the center of the steering wheel; a pad supporting easel; and an anti-friction bearing constituting a connection between said supporting means and said easel on an upwardly and rearwardly inclined single axis substantially aligned with the axis of said steering wheel and fixed with reference to said supporting means whereby the easel is supported for freely pendant positioning in a relatively fixed position with reference to the vehicle without being affected by rotation of said steering wheel.

4. In a holder of the class described, for the steering wheel of an automotive vehicle said steering wheel embodying a rim, a hub, radial arms joining said rim to said hub, a horn button and a horn button spider having a rim disposed radially inwardly of said wheel rim: a supporting arm including a bracket having an integral clamp jaw to engage the upper side of one of said radial arms, and an extension arm attached to said bracket for longitudinal extension radially of the steering wheel; a clamp including said jaw, a second jaw to engage the underside of said one radial arm and means connecting said jaws for clamping engagement of said one radial arm said supporting arm being offset upwardly from said clamp jaw so as to extend over said horn button when said bracket is clamped to said one radial arm; an antifriction bearing carried by the free end of said extension arm, on a non-horizontal axis in substantially vertical alignment with the center of the steering wheel and an easel mounted on said bearing, with the portion thereof below said axis of greater weight than the portion thereof above said axis whereby said easel will be gravity actuated to remain in an upright, non-rotating position irrespective of rotation of the steering wheel.

5. In a holder of the class described, for the steering wheel of an automotive vehicle said steering wheel embodying a rim, a hub, radial arms joining said rim to said hub, a horn button and a horn button spider having a rim disposed radially inwardly of said wheel rim; a supporting arm having at one end a pad; a clamp attachable to one of said radial arms; means pivotally connecting said pad to said clamp for swinging adjustment of said supporting arm and adapted to be actuated to lock the supporting arm to the clamp in any selected position of adjustment; an antifriction bearing carried by the free end of said extension arm on a non-horizontal axis in a substantially vertical alignment with the center of the steering wheel, and an easel mounted on said bearing, with the portion thereof below said axis of greater weight than the portion thereof above said axis whereby said easel will be gravity actuated to remain in an upright, non-rotating position irrespective of rotation of the steering wheel.

6. A holder as defined in claim 5, including a steering wheel operating knob rotatably supported on said pivotal connecting means.

7. In a holder for attachment to an automobile steering wheel embodying a rim, a hub, radial arms joining said rim to said hub, a horn button and a horn button spider having a rim disposed radially inwardly of said wheel rim; a bracket having at one end means to clamp the same to one of said radial arms beneath said horn button spider rim and having at its other end a supporting arm offset upwardly from said clamping means so as to extend over said horn button when the clamping means is thus attached to said one arm; an easel; and an anti-friction bearing having a single linear axis fixed with respect to said supporting arm, substantially in vertical alignment with the axis of said steering wheel, said bearing constituting a freely pivotal connection between said supporting arm and said easel at a point nearer the top than the bottom of said easel, whereby said easel is mounted for freely pendant positioning in response to the action of gravity, in a relatively fixed position with reference to the vehicle without being substantially affected by rotation of said steering wheel.

THOMAS WOLFE.

References Cited in the file of this patent

UNITED STATES PATENTS

| Number | Name | Date |
|---|---|---|
| 1,347,222 | Hufschmidt | July 20, 1920 |
| 1,892,721 | Cardarelli | Jan. 3, 1933 |
| 2,082,246 | Hollingsworth | June 1, 1937 |
| 2,150,709 | Bake | Mar. 14, 1939 |
| 2,487,536 | Fiscus | Nov. 8, 1949 |

FOREIGN PATENTS

| Number | Country | Date |
|---|---|---|
| 538,945 | France | Mar. 25, 1922 |
| 6,803 | Australia | Nov. 17, 1932 |